(12) United States Patent
Pionetti

(10) Patent No.: US 11,333,260 B2
(45) Date of Patent: May 17, 2022

(54) CONNECTOR WITH FLANGE FOR LIMITING BUCKLE PROPAGATION COMPRISING A DIFFERENTIAL PRESSURE VALVE FOR UNDERWATER FLUID-TRANSPORT PIPE

(71) Applicant: SAIPEM S.A., Montigny Le Bretonneux (FR)

(72) Inventor: François-Régis Pionetti, La Baleine (FR)

(73) Assignee: Saipem S.A., Montigny le Bretonneux (FR)

( * ) Notice: Subject to any disclaimer, the term of this patent is extended or adjusted under 35 U.S.C. 154(b) by 543 days.

(21) Appl. No.: 16/478,726

(22) PCT Filed: Nov. 30, 2017

(86) PCT No.: PCT/FR2017/053325
§ 371 (c)(1),
(2) Date: Jul. 17, 2019

(87) PCT Pub. No.: WO2018/138419
PCT Pub. Date: Aug. 2, 2018

(65) Prior Publication Data
US 2020/0049267 A1 Feb. 13, 2020

(30) Foreign Application Priority Data

Jan. 25, 2017 (FR) ...................................... 17 50597

(51) Int. Cl.
*F16K 17/04* (2006.01)
*F16L 57/02* (2006.01)
*F16L 55/07* (2006.01)

(52) U.S. Cl.
CPC .......... *F16K 17/0406* (2013.01); *F16L 57/02* (2013.01); *F16L 55/07* (2013.01); *F16L 2201/20* (2013.01); *Y10S 285/924* (2013.01)

(58) Field of Classification Search
CPC ....... F16L 55/07; F16L 2201/20; F16K 17/04; F16K 17/06; Y10S 285/924
See application file for complete search history.

(56) References Cited

U.S. PATENT DOCUMENTS 722,047 A * 3/1903 Robinson et al. ...... F16K 17/06
137/493
1,785,271 A 12/1930 Lemex
(Continued)

FOREIGN PATENT DOCUMENTS

| DE | 35 44 084 | 6/1987 |
|---|---|---|
| WO | WO 01/81803 | 11/2001 |
| WO | WO 2014/162027 | 10/2014 |

*Primary Examiner* — David Bochna
(74) *Attorney, Agent, or Firm* — Cozen O'Connor

(57) ABSTRACT

A junction part having a differential pressure valve (100) for an undersea fluid transport pipe, the valve having a valve body (102) with an internal chamber (106) opening out at one end into the pipe and at another end to the outside, a piston (110) arranged to subdivide the internal chamber into an admission chamber (106a) and a discharge chamber (106b), the piston being movable between an open position where admission chamber and the discharge chamber communicate with each other, and a closed position where the admission chamber and the discharge chamber are sealed from each other, a rating screw (112) screwed into the valve body and including a bore (114) within which there slides a rod (116) of the piston (110), and at least one hole (118) opening out into the discharge chamber and open to the outside, and a spring (120) rated so as to hold the piston in the closed position below a predetermined threshold pressure inside the admission chamber.

13 Claims, 3 Drawing Sheets

(56) References Cited

U.S. PATENT DOCUMENTS

| | | | | |
|---|---|---|---|---|
| 2,271,786 | A * | 2/1942 | Watkins | F16K 17/06 |
| | | | | 220/89.4 |
| 2,588,157 | A * | 3/1952 | Olson | F16K 17/06 |
| | | | | 137/516.29 |
| 2,601,563 | A * | 6/1952 | Selwyn | F16K 17/04 |
| | | | | 251/336 |
| 3,025,874 | A * | 3/1962 | Yocum | F16K 17/06 |
| | | | | 137/540 |
| 4,349,043 | A | 9/1982 | Christensen | |
| 5,215,116 | A * | 6/1993 | Voss | F16K 17/04 |
| | | | | 137/538 |
| 5,623,962 | A * | 4/1997 | Danzy | F16K 17/06 |
| | | | | 137/542 |
| 9,243,719 | B1 * | 1/2016 | Choate | F16K 17/04 |
| 2005/0115615 | A1 * | 6/2005 | Takayanagi | F16K 17/04 |
| | | | | 137/515 |
| 2013/0092395 | A1 * | 4/2013 | Hudson, II | F16K 17/04 |
| | | | | 166/373 |
| 2014/0261745 | A1 * | 9/2014 | Hayes | F16K 17/04 |
| | | | | 137/315.04 |
| 2015/0059884 | A1 * | 3/2015 | Grenaway | F16K 17/06 |
| | | | | 137/538 |
| 2020/0271240 | A1 * | 8/2020 | Kuhn | F16K 17/04 |
| 2021/0139349 | A1 * | 5/2021 | Pohjola | F16K 17/04 |

* cited by examiner

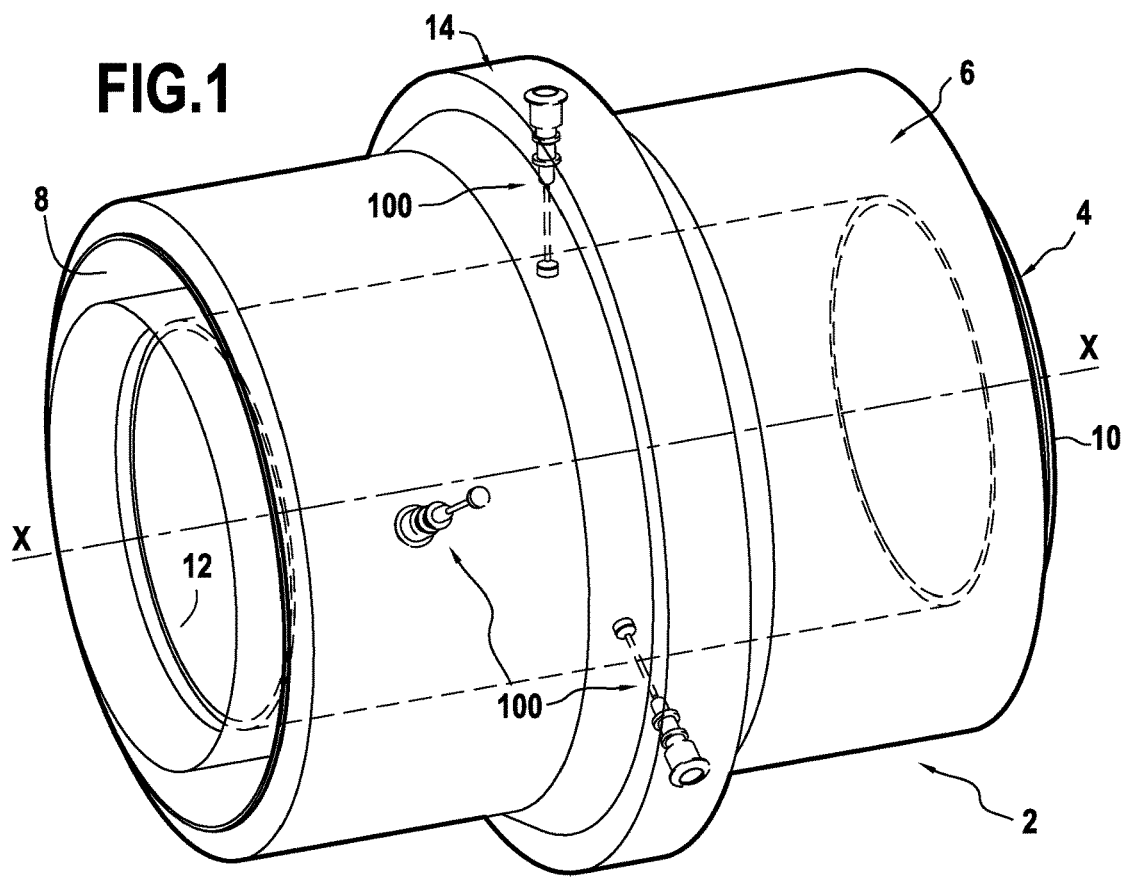

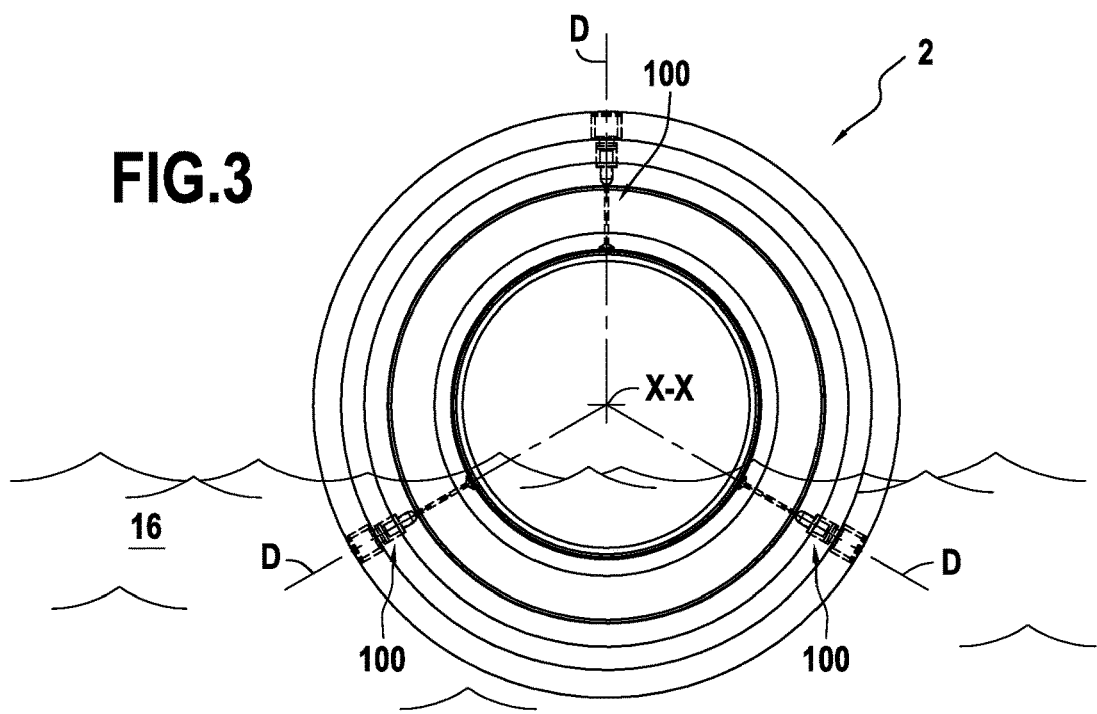
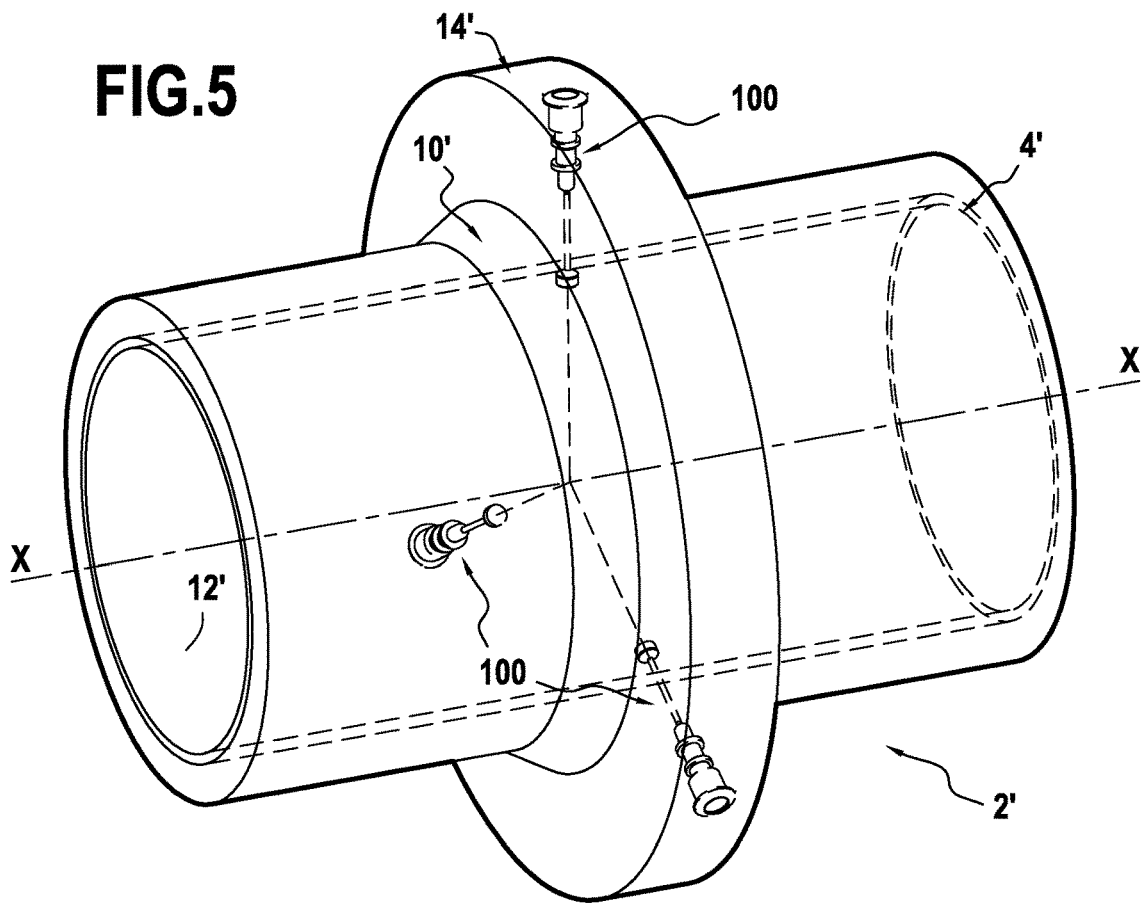

CONNECTOR WITH FLANGE FOR LIMITING BUCKLE PROPAGATION COMPRISING A DIFFERENTIAL PRESSURE VALVE FOR UNDERWATER FLUID-TRANSPORT PIPE

PRIORITY CLAIM

This is a U.S. national stage of application No. PCT/FR2017/053325, filed on Nov. 30, 2017. Priority is claimed on France Application No. FR17 50597, filed Jan. 25, 2017, the content of which is incorporated herein by reference.

BACKGROUND OF THE INVENTION

The present invention relates to the general field of undersea pipes that rest on the sea bottom or that provide a bottom-to-surface connection for transporting hydrocarbons, e.g. oil and gas, coming from undersea production wells.

The invention relates more precisely to a differential pressure valve fitted to undersea pipes (single- or double-walled) that are provided with an internal liner made of plastics material for transporting hydrocarbons.

A single- or double-walled undersea pipe for transporting hydrocarbons may be covered on its inside surface by an annular liner that contains the hydrocarbon fluids under pressure being transported. In general, the liner is made of plastics material, e.g. manufactured on the basis of polyethylene, of nylon, and of fluorinated polymers.

The lifetime of such a liner depends in particular on the speed with which the plastics material from which it is made degrades by chemical reaction on coming into contact with the compounds of the stream of hydrocarbons being transported. For fluids at low temperatures and containing few water molecules, a plastics material based on high density polyethylene (HD-PE) and on nylon can be used. For fluids at higher temperatures or containing more water, it is necessary to use a plastics material with greater thermal stability. Under such circumstances, recourse may be had to fluorinated polymers, such as polyvinylidene fluoride (PVDF).

Furthermore, the internal liners fitted to undersea pipes are permeable to hydrocarbons of low molecular weight. Also, in production, a continuous stream of gas (referred to as "permeation" gas) diffuses through the liner and fills the annular space formed between the liner and the inside surface of the pipe. The flow rate of the permeation gas that diffuses in this way through the liner depends on numerous factors, and in particular on the permeability coefficient of the plastics material constituting the liner, which permeability coefficient results directly from the composition of the plastics material used.

The permeation gas can accumulate in the annular space between the liner and the inside wall of the pipe. Unfortunately, in this situation, following the pipe being depressurized quickly, there is a major risk of the liner collapsing. It is therefore necessary to discharge this gas from the annular space in which it diffuses. For this purpose, it is known to install differential pressure valves at the ends of the pipe, which valves open out at one end into the annular space formed between the liner and the pipe, and open out at an opposite end into the ambient medium, i.e. sea water. When the pressure inside the annular space formed between the liner and the pipe exceeds a predetermined threshold, typically of the order of 1 bar to 5 bars above local hydrostatic pressure, the valves open and enable the permeation gas to be discharged out from the pipe into the sea.

Reference may be made to Document WO 99/56045, which describes an example architecture for a differential pressure valve used to discharge permeation gas from a flexible undersea pipe. That valve comprises in particular two valve members, so it is quite complicated to make. Furthermore, in that document, the only barrier against water and solid particles penetrating into the valve chamber is constituted by bubbles of gas. Unfortunately, such a barrier is not very leaktight.

OBJECT AND SUMMARY OF THE INVENTION

A main object of the present invention is thus to propose a differential pressure valve that does not present such drawbacks.

In accordance with the invention, this object is achieved by a differential pressure valve for an undersea fluid transport pipe, the valve comprising:

a valve body having arranged therein an internal chamber open at one end to the pipe within which there exists an internal pressure Pi, and open at another end to the outside where there exists an outside pressure Pe;

a piston arranged in the internal chamber so as to subdivide the internal chamber into an admission chamber communicating with the inside of the pipe and a discharge chamber communicating with the outside, the piston being movable between an open position in which the admission chamber and the discharge chamber communicate with each other, and a closed position in which the admission chamber and the discharge chamber are sealed from each other;

a rating screw screwed into the valve body and including a bore within which there slides a rod of the piston together with at least one hole opening out into the discharge chamber and open to the outside; and a spring positioned between the piston and the rating screw, said spring being rated so as to keep the piston in the closed position below a predetermined threshold pressure inside the admission chamber.

The permeation gas present inside the annular space between the liner and the inside wall of the pipe diffuses through the liner of the pipe and penetrates into the admission chamber of the valve. When the pressure inside the admission chamber exceeds the predetermined threshold pressure (typically corresponding to a pressure difference relative to the outside pressure Pe of about 1 bar to 5 bars), the piston of the valve opens, allowing the permeation gas to penetrate into the discharge chamber so as to be discharged to the outside of the pipe. In addition, the rating screw that is screwed into the valve body serves to set the rating of the spring so as to modify the threshold pressure from which the piston opens in order to discharge the permeation gas. The valve of the invention thus presents a design that is extremely simple, making it reliable and easy to manufacture.

Preferably, the holes in the rating screw open to the outside via a filter for the purpose of retaining impurities coming from the outside. The presence of such a filter serves to prevent impurities, in particular sand when the pipe rests on the sea bottom, from passing from the outside to the inside of the valve.

Under such circumstances, the filter opens advantageously to the outside through a membrane held in position by means of a spring working in compression. Such a membrane serves to allow the sea water contained in the filter to pass, while retaining sea water salts and other grains so as to prevent them from penetrating into the inside of the valve chamber.

The admission chamber may communicate with the inside of the pipe via a duct. Under such circumstances, the duct preferably opens out at one end into the admission chamber and opens out at an opposite end into the inside of the pipe via a strainer. The presence of such a strainer serves to retain grains and steel particles present in the annular space and that might be entrained by the permeation gas while it is being discharged through the valve.

The invention also provides a junction part for an undersea fluid transport pipe, the junction part comprising a sleeve for connecting to the ends of two unit pipe elements, a buckle arrestor flange projecting radially outwards from the sleeve, and at least three differential pressure valves as defined above, the valves being positioned radially within the flange.

The internal chamber of each valve may open out at one end to the inside of the sleeve and opens out at another end to the outside of the flange. More precisely, the internal chamber of each valve may open out at one end to the inside of the sleeve through a liner made of plastics material.

Preferably, the valves are regularly spaced apart from one another around an axis of revolution of the flange. Such an arrangement serves to guarantee that at least one of the valves does not open out to the sea bottom on which the flange rests in operation.

When the junction part is for a double-walled undersea pipe, the sleeve is an inner sleeve for connecting to the ends of two unit elements of an inner pipe wall, the junction part further comprising an outer sleeve arranged coaxially around the inner sleeve for connecting to the ends of two unit elements of an outer pipe wall, the flange projecting radially outwards from the outer sleeve.

BRIEF DESCRIPTION OF THE DRAWINGS

Other characteristics and advantages of the present invention appear from the following description made with reference to the accompanying drawings, which show an embodiment having no limiting character. In the figures:

FIG. 1 is a perspective view of a junction part for a double-walled undersea pipe and provided with differential pressure valves of the invention;

FIG. 2 is a longitudinal section view of the FIG. 1 junction part;

FIG. 3 is a cross-section view of the FIG. 1 junction part in situation;

FIG. 5 is a perspective view of a junction part for a single-walled undersea pipe provided with differential pressure valves of the invention.

DETAILED DESCRIPTION OF THE INVENTION

Figure 4:
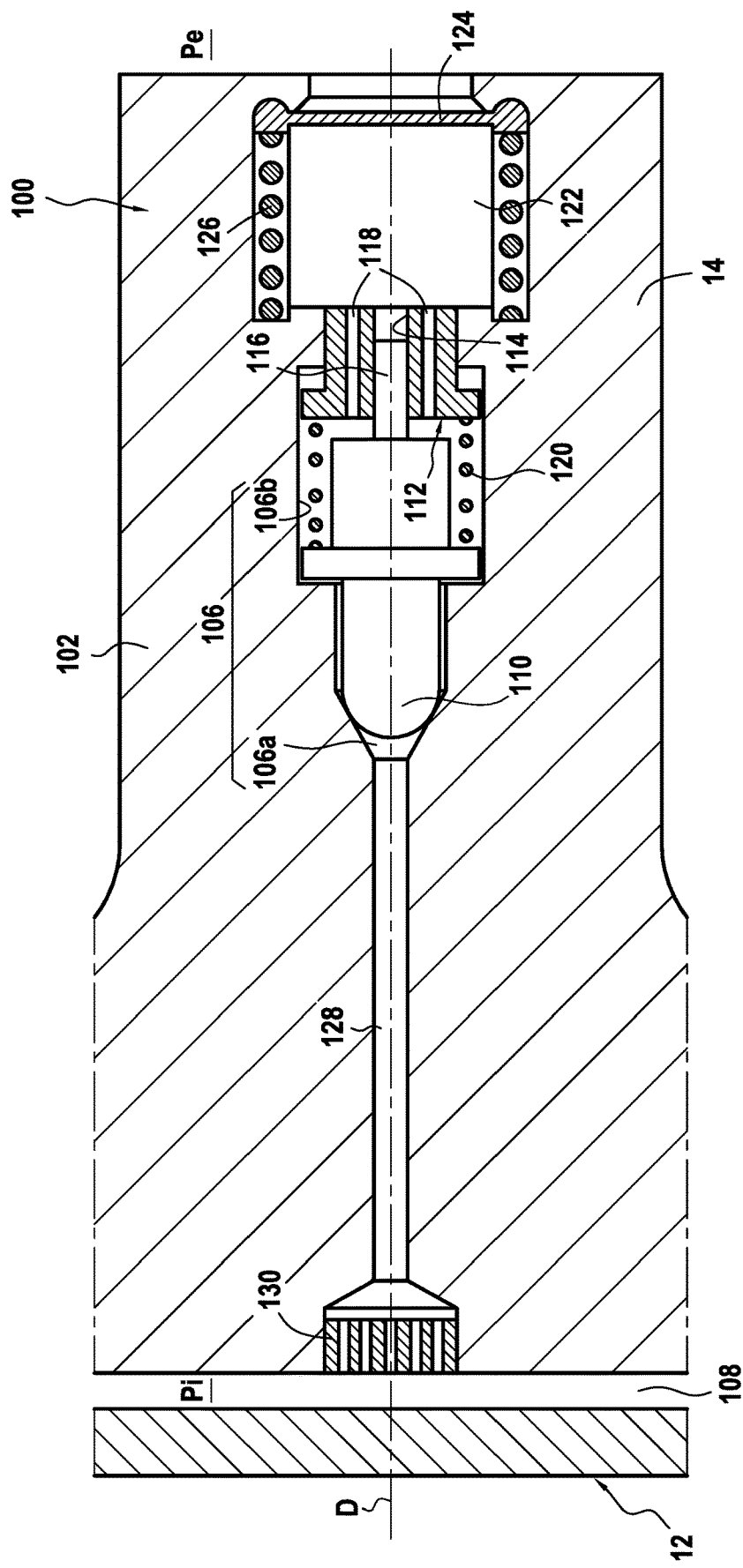
FIG. 4 is a longitudinal section view of one of the valves in FIGS. 1 to 3.

The invention applies to any undersea pipe resting on the sea bottom or providing a bottom-to-surface connection for transporting hydrocarbons, which pipes may be single-walled or double-walled.

The invention applies more particularly to undersea pipes for which the hydrocarbon fluids under pressure that are to be transported are confined in a liner of plastics material, the liner being permeable to hydrocarbons of low molecular weight, which form a permeation gas stream that needs to be discharged to the outside from the pipe (typically such permeation gas comprises $H_2S$, $CO_2$, and $CH_4$, mixed with water).

In order to discharge the permeation gas, the invention proposes a differential pressure valve that is fitted to such undersea pipes.

In an advantageous provision of the invention, such differential pressure valves are arranged in junction parts that are typically used for providing junctions between two unit pipe elements. Such junction parts are generally connection parts made of forged steel. An embodiment of such junction parts is described in particular in Document WO 2011/007075.

FIGS. 1 and 2 are a perspective view and a longitudinal section view showing an embodiment of a junction part 2 for connecting together two sections of a double-walled pipe.

In this non-limiting embodiment, the undersea pipe is a double-walled pipe that is made by assembling a plurality of pipe sections to one another, each pipe section comprising an inner wall unit element and an outer wall unit element arranged coaxially thereabout.

In known manner, the junction part 2 is an axisymmetric part centered on an axis of revolution X-X. In particular, it comprises an inner sleeve 4 for connecting to the ends of two inner wall unit elements of the double-walled pipe, and an outer sleeve 6 that is arranged around the inner sleeve 4, being coaxial therewith, and that is for connecting to the ends of two outer wall unit elements of said pipe. The annular space 8 defined between the inner and outer sleeves may contain insulating material (not shown in the figures).

The inner and outer sleeves present diameters that correspond substantially to the respective diameters of the inner and outer wall unit elements to which they are assembled by welding. Furthermore, these sleeves are connected to each other via an annular central portion 10.

The junction part 2 also has an annular liner 12 made of plastics material that covers the inside surface of the inner sleeve 4, this liner receiving the hydrocarbon fluids under pressure that are to be transported. In known manner, the liner is made of a plastics material that may contain polyethylene, nylon, and fluorinated polymers.

In the central portion 10, the junction part 2 also has a flange 14 for limiting the propagation of buckling, which flange projects radially outwards from the outer sleeve 6. For the pipe as a whole, the various flanges 14 form local extra thicknesses at regular intervals along the pipe that serve to limit any risk of propagating the effect of the pipe buckling as a result of instabilities in the shape of sections of the pipe as generated by the external hydrostatic pressure of sea water.

The flange 14 thus constitutes a device for limiting buckle propagation, also known as a "buckle arrestor". In known manner, by means of these devices, in the event of the pipe starting to buckle and of the buckling propagating, the buckling remains limited to the range between the two flanges on either side of the start of buckling.

The buckle arrestor flange 14 of the junction part has differential pressure valves 100 of the invention, each for the purpose of discharging to the outside permeation gas that has diffused through the liner 12.

More precisely, each differential pressure valve 100 extends lengthwise along a radial direction D relative to the junction part, opening out to the inside of the inner sleeve 4 of the junction part in a common plane extending transversely relative to the junction part.

Furthermore, as shown in FIG. 3, the differential pressure valves are at least three in number and they are preferably regularly distributed around the axis of revolution X-X of the junction part. Such 120° spacing between the valves serves to ensure that there is always at least one valve opening out into the ambient medium, i.e. sea water, even if the other two valves have become buried in the sand in the sea bottom 16, as shown in FIG. 3.

With reference to FIG. 4, there follows a description of the architecture of the differential pressure valve 100 of the invention.

This valve comprises in particular a valve body 102 that is formed by the flange 14 of the junction part and within which there is provided an internal chamber 106. The internal chamber opens out at one end into the annular gap 108 provided between the inside surface of the inner sleeve 4 and the liner 12, and within which there exists an internal pressure Pi. At its opposite end, the internal chamber opens to the outside, i.e. into the ambient medium (i.e. the sea) where there is an external pressure Pe.

A piston 110 is arranged in the internal chamber 106 so as to subdivide it into an admission chamber 106a communicating with the annular gap 108, and a discharge chamber 106b communicating with the outside.

The piston 110 lies between two extreme positions, namely an open position in which the admission chamber 106a and the discharge chamber 106b are in communication with each other, and a closed position, as shown in FIG. 4, in which the admission chamber and the discharge chamber are sealed relative to each other.

In the open position, the piston 110 has a rounded end resting on a seat of frustoconical shape so as to provide good sealing between the admission and discharge chambers while avoiding any risk of the piston jamming.

The valve also has a rating screw 112 that is screwed into the valve body. This rating screw has a bore 114 within which the rod 116 of the piston 110 slides, together with one or more holes 118 opening out into the discharge chamber 106b and open to the outside.

The valve also has a spring 120 that is positioned between the piston 110 and the rating screw 112, the spring being rated so as to hold the piston in the closed position below a predetermined threshold pressure Ps inside the admission chamber 106a. This threshold pressure is adjusted by tightening or loosening the rating screw 112 to a greater to lesser extent.

The holes 118 in the rating screw 112 preferably open out towards the outside via a filter 122 that serves to retain impurities coming from the outside. Thus, the filter 122 prevents impurities from the outside, and in particular sand when the pipe is resting on the sea bottom, from passing towards the inside of the valve. In contrast, the filter is permeable to permeation gas (including $H_2s$, $CO_2$, $CH_4$), and to water.

Also preferably, the filter 122 opens to the outside via a membrane 124 that is held in position by means of a spring 126 working in compression. In the example shown in FIG. 4, the spring 126 is mounted around the filter 122. This membrane 124 serves to pass permeation gas and water, while retaining sea water salts and other grains so as to prevent them from penetrating into the inside of the valve chamber.

At the opposite end of the valve, the admission chamber 106a communicates with the inside of the annular gap 108 formed between the inside surface of the inner sleeve 4 and the liner 12 by means of a duct 128.

More precisely, the duct 128 is connected to a strainer 130 at its end that opens out into the gap 108. By way of example, the strainer has a plurality of through holes, each having a diameter of 1 millimeter (mm).

This differential pressure valve operates as follows. In production, a continuous stream of permeation gas diffuses through the liner 12 and in particular fills the annular gap 108 that exists between the inside surface of the inner sleeve 4 of the junction part 2 and the liner. This permeation gas passes through the strainer 130 of each differential pressure valve and fills its admission chamber 106a. When the pressure inside the admission chamber exceeds the predetermined threshold pressure Ps, the piston 110 moves into the open position so as to allow the permeation gas to penetrate into the discharge chamber 106b, and it then flows through the holes 118 in the rating screw 112 in order to pass through the filter 122 and the osmotic membrane 124 so as to be discharged to the outside into the ambient medium (i.e. sea water).

In the above-described element, the junction part in which the differential pressure valves of the invention are positioned is a junction part for a double-walled undersea pipe.

Naturally, differential pressure valves of the invention could equally well be mounted in junction parts for single-walled undersea pipes, such as the junction part 2' shown in FIG. 5.

In known manner, this junction part 2' is an axisymmetric part centered on an axis of revolution X-X. In particular, it has a sleeve 4' that is to be connected to the ends of two single-walled pipe unit elements, the sleeve having a diameter corresponding substantially to the diameter of the unit elements of the pipe and they are connected thereto by welding.

The junction part 2' also has an annular liner 12' made of plastics material that covers the inside surface of the sleeve 4', the liner receiving the hydrocarbon fluids under pressure that are to be transported.

Finally, in the central portion 10' of the sleeve 4', the junction part 2' also has a buckle arrestor flange 14' that projects radially outwards. The flange 14' thus forms local extra thickness that serves to limit any risk of propagating the affects of the pipe buckling as a result of instabilities in the shape of sections of the pipe as generated by the external hydrostatic pressure of sea water.

Like the junction part described with reference to FIGS. 1 to 3, the buckle arrestor 14' of the junction part 2 has differential pressure valves 100 of the invention, each of which is for the purpose of discharging to the outside permeation gas that diffuses through the liner 12'.

The arrangement within the flange 14' and the characteristics of the differential pressure valves 100 are completely identical to the arrangement and characteristics described above with reference to FIGS. 1 to 4.

The invention claimed is:

1. A junction part for an undersea fluid transport pipe, the junction part comprising:
    a sleeve for connecting to the ends of two unit pipe elements;
    a buckle arrestor flange projecting radially outwards from the sleeve; and
    at least three differential pressure valves positioned radially within the flange, each differential pressure valve comprising:
        a valve body having arranged therein an internal chamber open at one end to the pipe within which there exists an internal pressure Pi, and open at another end to the outside of the unit pipe element where there exists an outside pressure Pe;

a piston arranged in the internal chamber so as to subdivide the internal chamber into an admission chamber communicating with the inside of the pipe and a discharge chamber communicating with the outside, the piston being movable between an open position in which the admission chamber and the discharge chamber communicate with each other, and a closed position in which the admission chamber and the discharge chamber are sealed from each other;

a rating screw screwed into the valve body and including a bore within which there slides a rod of the piston together with at least one hole opening out into the discharge chamber and open to the outside; and a spring positioned between the piston and the rating screw, said spring being rated so as to keep the piston in the closed position below a predetermined threshold pressure inside the admission chamber.

2. The junction part according to claim 1, wherein the holes in the rating screw open to the outside via a filter for the purpose of retaining impurities coming from the outside.

3. The junction part according to claim 2, wherein the filter opens to the outside through a membrane held in position by means of a spring working in compression.

4. The junction part according to claim 1, wherein the admission chamber communicates with the inside of the pipe via a duct.

5. The junction part according to claim 4, wherein the duct opens out at one end into the admission chamber and opens out at an opposite end into the inside of the pipe via a strainer.

6. The junction part according to claim 5, wherein the internal chamber of each valve opens out at one end to the inside of the sleeve and opens out at another end to the outside of the flange.

7. The junction part according to claim 1, wherein the internal chamber of each valve opens out at one end to the inside of the sleeve and opens out at another end to the outside of the flange.

8. The junction part according to claim 7, wherein the internal chamber of each valve opens out at one end to the inside of the sleeve through a liner made of plastics material.

9. The junction part according to claim 8, wherein the valves are regularly spaced apart from one another around an axis of revolution (X-X) of the flange.

10. The junction part according to claim 8, wherein the sleeve is an inner sleeve for connecting to the ends of two unit elements of an inner pipe wall, the junction part further comprising an outer sleeve arranged coaxially around the inner sleeve for connecting to the ends of two unit elements of an outer pipe wall, the flange projecting radially outwards from the outer sleeve.

11. The junction part according to claim 7, wherein the internal chamber of each valve opens out at one end to the inside of the sleeve through a liner made of plastics material.

12. The junction part according to claim 1, wherein the valves are regularly spaced apart from one another around an axis of revolution (X-X) of the flange.

13. The junction part according to claim 1, wherein the sleeve is an inner sleeve for connecting to the ends of two unit elements of an inner pipe wall, the junction part further comprising an outer sleeve arranged coaxially around the inner sleeve for connecting to the ends of two unit elements of an outer pipe wall, the flange projecting radially outwards from the outer sleeve.

* * * * *